United States Patent
Hsieh et al.

(10) Patent No.: US 8,204,872 B2
(45) Date of Patent: Jun. 19, 2012

(54) METHOD AND SYSTEM FOR INSTANTLY EXPANDING A KEYTERM AND COMPUTER READABLE AND WRITABLE RECORDING MEDIUM FOR STORING PROGRAM FOR INSTANTLY EXPANDING KEYTERM

(75) Inventors: Chang-Tai Hsieh, Taipei County (TW); Chuo-Yen Lin, Taipei (TW); Chia-Yuan Yang, Taipei County (TW); Shih-Chun Chou, Taipei (TW)

(73) Assignee: Institute for Information Industry, Taipei (TW)

( * ) Notice: Subject to any disclaimer, the term of this patent is extended or adjusted under 35 U.S.C. 154(b) by 538 days.

(21) Appl. No.: 12/410,447

(22) Filed: Mar. 24, 2009

(65) Prior Publication Data
US 2010/0205200 A1  Aug. 12, 2010

(30) Foreign Application Priority Data

Feb. 6, 2009  (TW) .............................. 98103881 A

(51) Int. Cl.
G06F 7/00 (2006.01)
G06F 17/30 (2006.01)
(52) U.S. Cl. ......... 707/707; 707/722; 707/770; 707/780
(58) Field of Classification Search .................. 707/705, 707/706, 707, 708, 736, 737, 738, 739, 750, 707/758, 769, 770, 771, 776, 780, 999.003
See application file for complete search history.

(56) References Cited

U.S. PATENT DOCUMENTS

| 5,913,215 | A  | * | 6/1999  | Rubinstein et al. ........... 707/708 |
| 6,633,868 | B1 | * | 10/2003 | Min et al. ........................... 707/3 |
| 6,920,448 | B2 | * | 7/2005  | Kincaid et al. .................... 707/3 |
| 7,130,848 | B2 | * | 10/2006 | Oosta ................................. 707/5 |
| 7,440,947 | B2 | * | 10/2008 | Adcock et al. ................ 707/708 |
| 2005/0071333 | A1 | * | 3/2005 | Mayfield et al. .................. 707/5 |
| 2005/0076003 | A1 | * | 4/2005 | DuBose et al. ................... 707/1 |
| 2005/0177555 | A1 | * | 8/2005 | Alpert et al. ...................... 707/3 |
| 2008/0147638 | A1 | * | 6/2008 | Hoeber et al. .................... 707/5 |
| 2008/0281810 | A1 | * | 11/2008 | Smyth et al. ..................... 707/5 |

* cited by examiner

Primary Examiner — Marc Somers
(74) Attorney, Agent, or Firm — Jianq Chyun IP Office

(57) ABSTRACT

A method for instantly expanding a keyterm is provided. According to the query term, a data search process is performed by several search engines. Several document snippets related to the query term are obtained from the search engines. A related term table containing several keyterms corresponding to each snippet is built up by analyzing each of the document snippet. According to a position relationship between the each keyterm and the query term in each snippet, a correlation calculation is performed for giving each keyterm a correlation value. A semantic merging process is performed to merge the correlation values of the keyterms with the same semantic meaning to be a correlation indicator. Some of the keyterms are determined to form a keyterm set of the query term.

12 Claims, 3 Drawing Sheets

METHOD AND SYSTEM FOR INSTANTLY EXPANDING A KEYTERM AND COMPUTER READABLE AND WRITABLE RECORDING MEDIUM FOR STORING PROGRAM FOR INSTANTLY EXPANDING KEYTERM

CROSS-REFERENCE TO RELATED APPLICATION

This application claims the priority benefit of Taiwan application serial no. 98103881, filed on Feb. 6, 2009. The entirety of the above-mentioned patent application is hereby incorporated by reference herein and made a part of specification.

BACKGROUND OF THE INVENTION

1. Field of Invention

The present invention relates to a data search method, a data search system and a computer readable and writable recording medium for storing a data search program. More particularly, the present invention relates to a method and a system for instantly expanding a keyterm and a computer readable and writable recording medium for storing a program for instantly expanding the keyterm.

2. Description of Related Art

At present, the information is highly expanded and people increasingly rely on the rapid data search service provided by the Internet. When the Internet user population is increased, the advertising profit generated from displaying the search result and the Internet articles together with the advertising becomes the revenue resource of each website platform.

Although the advertising with the fixed layout mode has the certain advertisement effect, it cannot accurately get the attentions from the major consumers. Thus, the keyterm advertising becomes the major type of the Internet advertising. Base on matching the advertising keyterms provided by the advertising companies with the query term, or the query string input into the search engines by the user or with the specific term or the title appearing on the current browsed web page, the proper advertisings will be chose and real-time displayed together with the search result or the browsed web pages. Therefore, the advertisement changed with the query term or browsed web articles can effectively get the attentions from the specific consumers.

However, choosing the advertisings only based on the query term input into the search engines by the user or the specific term in the current browsed web page will limit the species and the variety of the advertisement. Therefore, it will screen out many potential consumers. Hence, how to enhance the advertising matching accuracy and the variety of the advertisement becomes an important development task.

SUMMARY OF THE INVENTION

Accordingly, at least one objective of the present invention is to provide a method for instantly expanding a keyterm capable of providing a relatively accurate and extensive keyterm set to the advertisement matching by automatically searching the keyterms with the same meaning according to the query term.

At least another objective of the present invention is to provide a system for instantly expanding a keyterm capable of increase the speed for expanding the keyterm.

The present invention further provides a computer readable and writable recording medium for storing a program for instantly expending a keyterm without being limited by the database with limited capacity and without shifting the data search domain.

To achieve these and other advantages and in accordance with the purpose of the invention, as embodied and broadly described herein, the invention provides a method for instantly expanding a keyterm. The method comprises steps of receiving a query term and then implementing a data search process on a plurality of search engines according to the query term. Thereafter, a plurality of document snippets related to the query term are obtained from each of the search engines. Each document snippet contains at least a sentence. Each of the document snippets is analyzed to create a related term table. For each of the document snippets in the related term table, a plurality of keyterms appeared in each of the document snippets are listed and each of the keyterms possesses a semantic meaning. Then, according to a position relationship between the query term and each of the keyterms in each of the document snippets, a correlation calculation is performed for giving each of the keyterms in each of the document snippets a correlation value. Thereafter, a semantic merging process is implemented to merge the correlation values of the keyterms with the same semantic meaning throughout the document snippets to be a correlation indicator. According to the correlation indicator of each of the keyterms, portions of the keyterms are determined to be a keyterm set of the query term.

According to one embodiment of the present invention, the correlation calculation is performed according to a first equation as following:

$$\text{score}(\text{Query}, \text{Keyterm}_j) = \frac{2NS(\text{Query} \cap \text{Keyterm}_j)}{NS(\text{Query}) \cup NS(\text{Keyterm}_j)} \times \frac{1}{1 + \text{dist}(\text{Query}, \text{Keyterm}_j)},$$

wherein Query denotes the query term, $\text{Keyterm}_j$ denotes the keyterm, score (Query, $\text{Keyterm}_j$) denotes the correlation value of the keyterm related to the query term, $NS(\text{Query} \cap \text{Keyterm}_j)$ denotes a frequency of the keyterm and the query term appearing in the same single sentence, $NS(\text{Query})$ denotes an appearance frequency of the query term appearing in the document snippet, $NS(\text{Keyterm}_j)$ denotes an appearance frequency of the keyterm appearing in the document snippet, $NS(\text{Query}) \cup NS(\text{Keyterm}_j)$ denotes a sum of the appearance frequency of the query term appearing in the document snippet and the appearance frequency of the keyterm appearing in the document snippet, $\text{dist}(\text{Query}, \text{Keyterm}_j)$ denotes the number of the sentences interleaving between the query term and the keyterm.

According to one embodiment of the present invention, the semantic merging process further comprises performing a semantic centroid calculation for calculating the correlation values of keyterms having the same semantic meaning throughout the document snippets to be a plurality of centroid values respectively. Then, a normalization process is performed for normalizing the centroid values to be a plurality of correlation indicators respectively. A sum of the correlation indicators is equal to 1. Furthermore, the semantic centroid calculation is performed according to a second equation as following:

$$SC(Keyterm) = \frac{1}{n} \times \frac{\sum_{i=1}^{n} snippet_i}{\sqrt{\sum_{i=1}^{n} snippet_i^2}},$$

wherein Keyterm denotes the keyterm, SC (Keyterm) denotes the centroid value of the keyterm, snippet denotes the document snippet, n denotes the number of the document snippets. Moreover, the normalization process is performed according to a third equation as following:

$$NSC(Keyterm_k) = \frac{SC(Keyterm_k)}{\sqrt{\sum_{k=1}^{w} SC(Keyterm_k)^2}},$$

wherein $Keyterm_k$ denotes the keyterm, NSC ($Keyterm_k$) denotes the correlation indicator of the keyterm, SC ($Keyterm_k$) denotes the centroid value of the keyterm, w denotes the number of the keyterms.

According to one embodiment of the present invention, the method for creating the related term table comprises analyzing each of the document snippets to list a plurality of the potential terms for each of the document snippets and then performing a weighting calculation for determining the keyterms corresponding to each of the document snippets from the potential terms of each of the document snippets.

According to one embodiment of the present invention, the weighting calculation comprises a term frequency-inverse document frequency calculation.

The present invention also provides a system for instantly expanding a keyterm. The system comprises a user interface, a search module, a data obtaining module, a term analyzing module, a correlation analyzing module, a semantic merging module and a keyterm set determining module. The user interface is used for receiving a query term. The search module is used for performing a data search process according to the query term by using a plurality of search engines. The data obtaining module is used for obtaining a plurality of document snippets related to the query term from each of the search engines. Each of the document snippets possesses at least a sentence. Furthermore, the term analyzing module is used for analyzing each of the document snippets to create a related term table. For each of the document snippets in the related term table, a plurality of keyterms appeared in each of the document snippet are listed and each of the keyterms possesses a semantic meaning. The correlation analyzing module is used for giving each of the keyterms in each of the document snippets a correlation value according to a position relationship between the query term and each of the keyterms in each of the document snippets. Further, the semantic merging module is used for merging the correlation values of the keyterms with the same semantic meaning throughout the document snippets to be a correlation indicator. The keyterm set determining module is used for determining portions of the keyterms to be a keyterm set of the query term according to the correlation indicator of each of the keyterms.

The present invention further provides a computer readable and writeable recording medium for storing a program for instantly expanding a keyterm, wherein the program for instantly expanding a keyterm executes a plurality of instructions comprising: receiving a query term and then implementing a data search process on a plurality of search engines according to the query term. Thereafter, a plurality of document snippets related to the query term are obtained from each of the search engines. Each document snippet contains at least a sentence. Each of the document snippets is analyzed to create a related term table. For each of the document snippets in the related term table, a plurality of keyterms appeared in each of the document snippet are listed and each of the keyterms possesses a semantic meaning. Then, according to a position relationship between the query term and each of the keyterms in each of the document snippets, a correlation calculation is performed for giving each of the keyterms in each of the document snippets a correlation value. Thereafter, a semantic merging process is implemented to merge the correlation values of the keyterms with the same semantic meaning throughout the document snippets to be a correlation indicator. According to the correlation indicator of each of the keyterms, portions of the keyterms are determined to be a keyterm set of the query term.

In the present invention, according to the query term, the document snippets instantly obtained by using the search engines are used as a semantic space instead of storing the whole documents. Hence, the keyterm expansion speed of the query term is increased and the speed for displaying the keyterm set is increased as well. Consequently, it is unnecessary to build up a bulk database for storing the searched documents. Hence, demands for the memory space to operate the search process is decreased. Moreover, since it is unnecessary to build up a database for storing the documents related to the query term, the database maintenance is unnecessary. Further, because the search engines directly search data in the Internet instead of searching the data in the fixed database, the search result related to the query term is not limited by the specific data domain of the database. Accordingly, the problem of the search result belonging to specific field due to the data domain shifting can be overcome.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
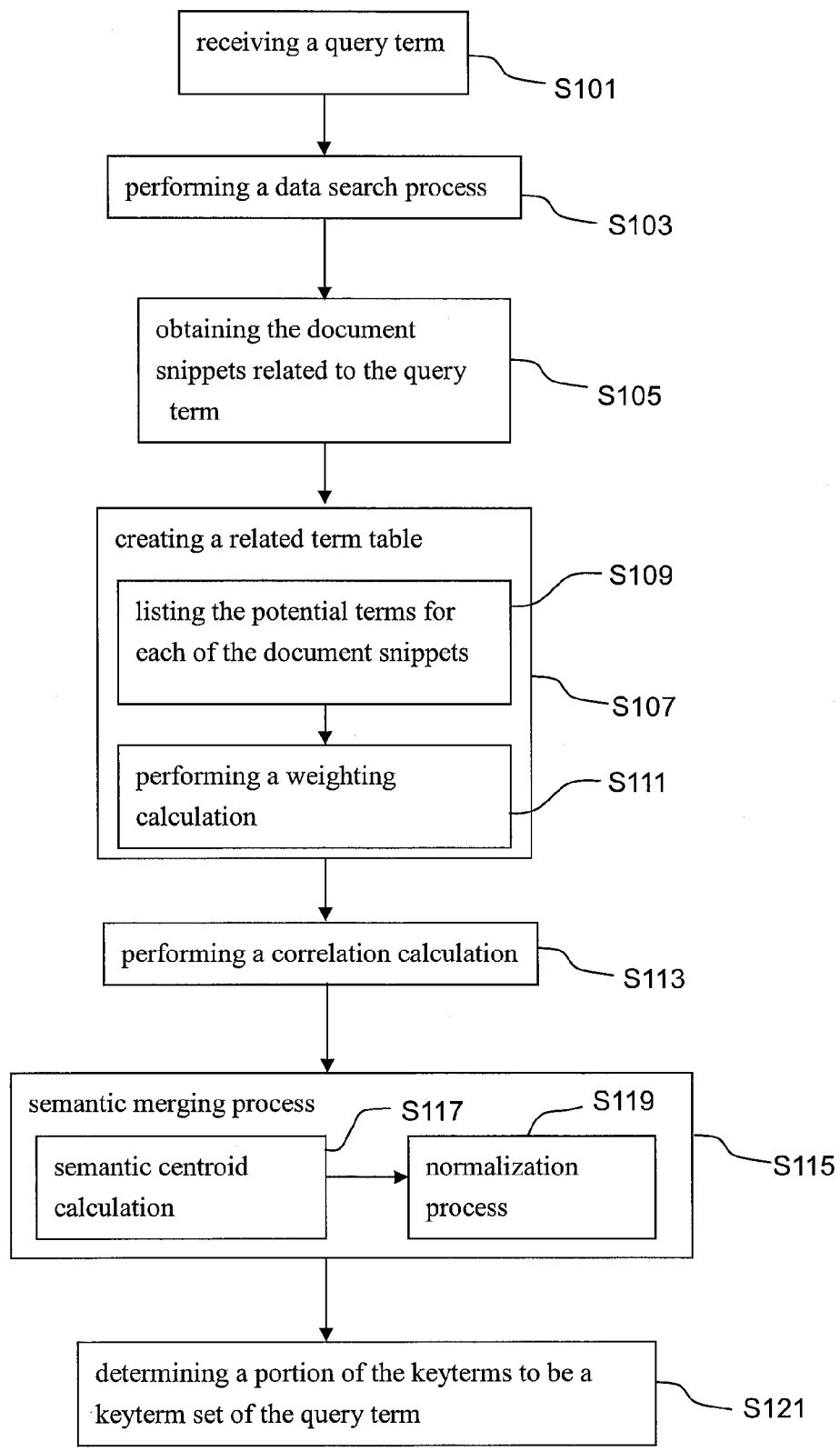
FIG. 1 is a flow chart schematically illustrating a method for instantly expanding a keyterm according to one embodiment of the invention.

FIG. 1 is a flow chart schematically illustrating a method for instantly expanding a keyterm according to one embodiment of the invention. As shown in FIG. 1, in the step S101, a query term is received. Then, in the step S103, according to the received query term, a data search process is performed by using several search engines. The data resource, in which each search engine implements the data search process, includes web pages, blogs, news and forums. Furthermore, the search engines include Yahoo!™, Google™, AOL.com™, MSN™ etc. Thereafter, in the step S105, several document snippets, which are related to the received query term, are obtained from each of the search engine. Each of the document snippets possesses at least one sentence. Additionally, in the step S105, it further comprises a comparison step for eliminate duplicated document snippets in order to prevent the accuracy of the keyterms in the related term table created in the later process step from being disturbed by redundant and duplicated document snippets.

Figure 2:
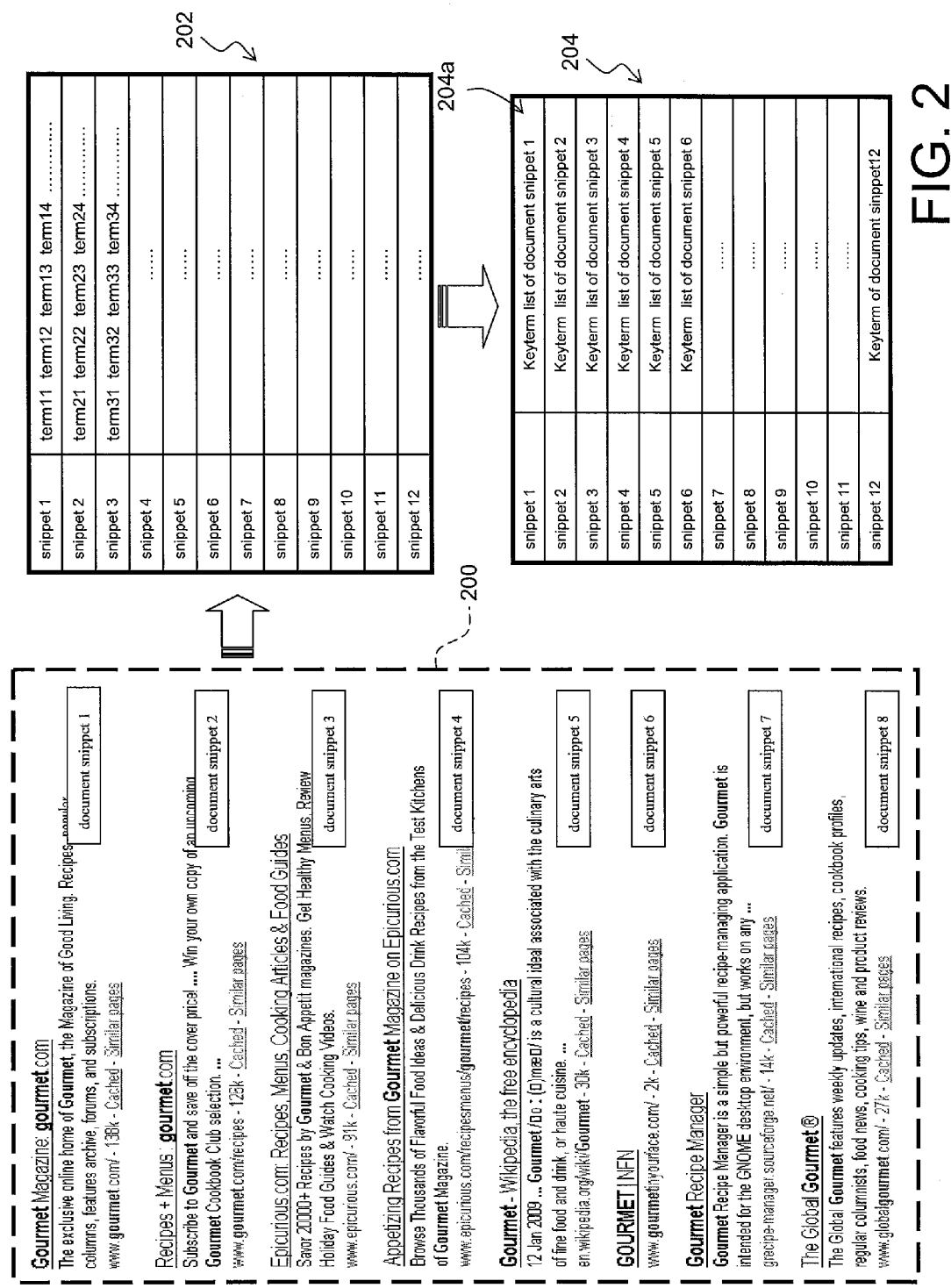
FIG. 2 is a flow chart schematically illustrating a method for creating a related term table in the method for instantly expanding the keyterm shown in FIG. 1.

FIG. 2 is a flow chart schematically illustrating a method for creating a related term table in the method for instantly expanding the keyterm shown in FIG. 1. As shown in FIG. 2, in the step S105, the document snippets obtained from the search engines (i.e. the document snippets containing the query term) are aggregated to form a document snippet set labeled 200. In the present embodiment, "gourmet" is used as the query term and the document snippets 1 through 8 are the document snippets, which contain "gourmet", within the searched documents. Taking the document snippet 8 in the document snippet set 200 as an example, the number of the sentences, each of which is composed of words between two punctuations closely adjacent to each other, is 7.

Then, as shown in FIG. 1 and FIG. 2, in the step S107, each of the document snippets is analyzed to create a related term table 204. For each of the document snippets in the related term table 204, several keyterms, which are appeared in the corresponding document snippet, are listed (i.e. the keyterm lists 204a of the document snippets 1~12 in the related term table 204). Each of the keyterms possesses one semantic meaning. In one embodiment, the method for creating the related term table further comprises analyzing each of the document snippets for listing several potential terms in each of the document snippets (step S109). As shown in the potential term table 202 in FIG. 2, each document snippet possesses several corresponding potential terms. Thereafter, in the step S111, a weighting calculation is performed so as to determine the keyterms of each of the document snippets from the potential terms of each of the document snippets. The weighting calculation comprises a term frequency-inverse document frequency calculation.

In the step S113, according to a position relationship between the received query term and each of the keyterms in each of the document snippets in the related term table 204, a correlation calculation is implemented for giving each of the keyterms in each of the document snippets a correlation value. It should be noticed that the correlation calculation is performed to calculate the correlation value between the query term and one of the keyterms in single document snippet according to a first equation. The first equation is show as following:

$$\text{score}(\text{Query}, \text{Keyterm}_j) = \frac{2NS(\text{Query} \cap \text{Keyterm}_j)}{NS(\text{Query}) \cup NS(\text{Keyterm}_j)} \times \frac{1}{1 + \text{dist}(\text{Query}, \text{Keyterm}_j)},$$

wherein Query denotes the query term, Keyterm$_j$ denotes the keyterm, score (Query, Keyterm$_j$) denotes the correlation value of the keyterm related to the query term, NS(Query∩Keyterm$_j$) denotes a frequency of the keyterm and the query term appearing in the same single sentence, NS(Query) denotes an appearance frequency of the query term appearing in the document snippet, NS(Keyterm$_j$) denotes an appearance frequency of the keyterm appearing in the document snippet, NS(Query)∪NS(Keyterm$_j$) denotes a sum of the appearance frequency of the query term appearing in the document snippet and the appearance frequency of the keyterm appearing in the document snippet, dist(Query, Keyterm$_j$) denotes the number of the sentences interleaving between the query term and the keyterm.

In the step S115, a semantic merging process is performed to merge the correlation values of the keyterms with the same semantic meaning throughout the document snippets to be the correlation indicators. In one embodiment, the aforementioned semantic merging process further comprises performing a semantic centroid calculation (step S117) for calculating the correlation values of keyterms having the same semantic meaning throughout the document snippets to be the centroid values respectively. The semantic centroid calculation is performed according to a second equation as following:

$$SC(\text{Keyterm}) = \frac{1}{n} \times \frac{\sum_{i=1}^{n} \text{snippet}_i}{\sqrt{\sum_{i=1}^{n} \text{snippet}_i^2}},$$

wherein Keyterm denotes the keyterm, SC (Keyterm) denotes the centroid value of the keyterm, snippet denotes the document snippet, n denotes the number of the document snippets.

Thereafter, a normalization process (step S119) is implemented for normalizing the centroid values to be the correlation indicators respectively. Noticeably, the sum of the correlation indicators is equal to 1. The normalization process is performed according to a third equation as following:

$$NSC(\text{Keyterm}_k) = \frac{SC(\text{Keyterm}_k)}{\sqrt{\sum_{k=1}^{w} SC(\text{Keyterm}_k)^2}},$$

wherein Keyterm$_k$ denotes the keyterm, NSC (Keyterm$_k$) denotes the correlation indicator of the keyterm, SC (Keyterm$_k$) denotes the centroid value of the keyterm, w denotes the number of the keyterms.

In the step S121, according to the correlation indicator of each of the keyterms, portions of the keyterms are determined to be a keyterm set of the query term. That is, the larger the correlation indicator of the keyterm is, the higher the correlation between the keyterm and the query term is and the higher possibility of the keyterm to be chosen into the keyterm set is. Alternatively, the smaller the correlation indicator of the keyterm is, the lower the correlation between the keyterm and the query term is and the lower possibility of the keyterm to be chosen into the keyterm set is.

Figure 3:
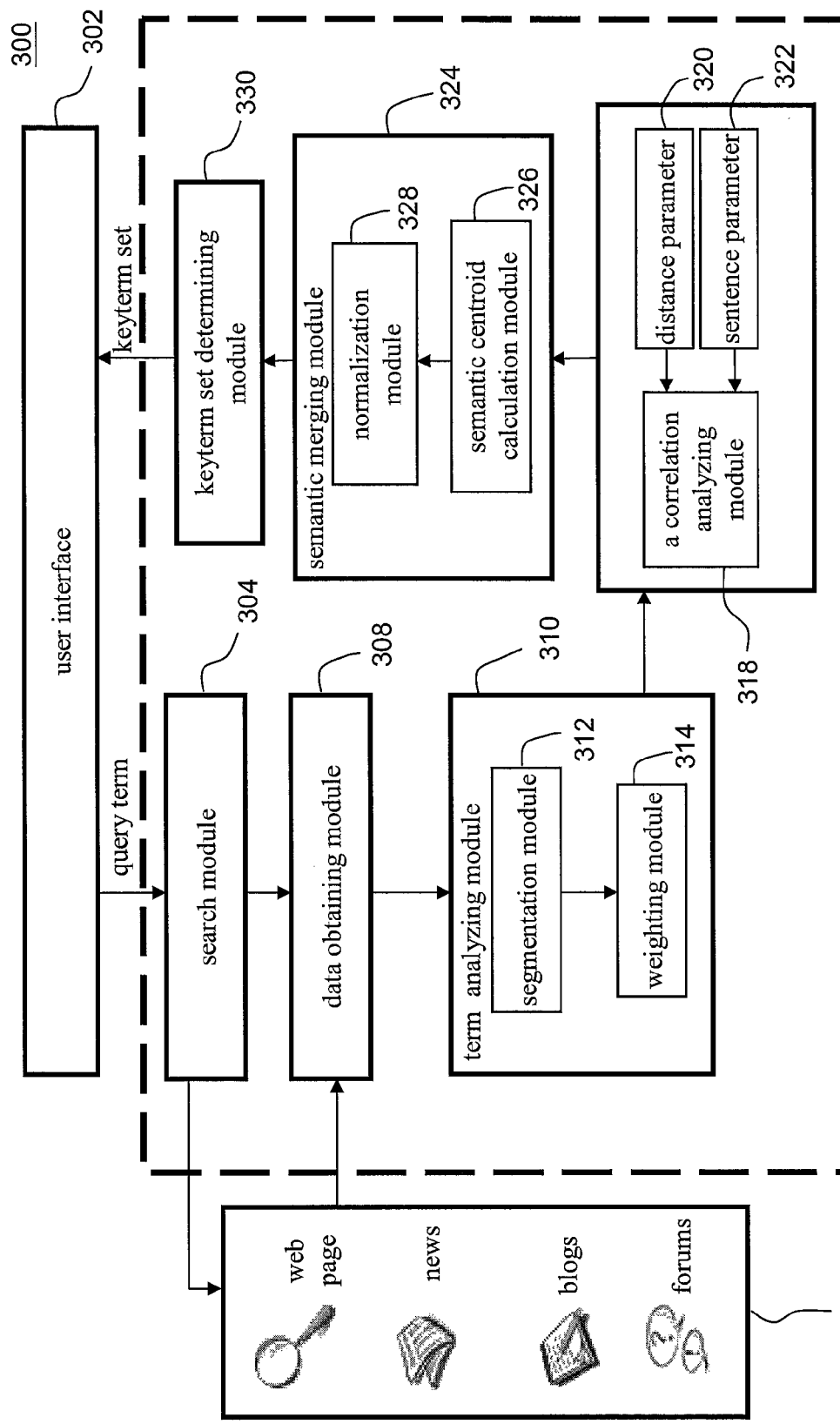
FIG. 3 is a schematically drawing showing a system for instantly expanding a keyterm according to one embodiment of the invention.

FIG. 3 is a schematically drawing showing a system for instantly expanding a keyterm according to one embodiment of the invention. As shown in FIG. 3, the system 300 for instantly expanding a keyterm of the present invention comprises a user interface 302, a search module 304, a data obtaining module 308, a term analyzing module 310, a correlation analyzing module 318, a semantic merging module 324 and a keyterm set determining module 330. The user interface 302 is used for receiving a query term. The search module 304 is used for performing a data search process according to the query term by using several search engines 306. The data resource, in which each search engine implements the data search process, includes web pages, blogs, news and forums.

The data obtaining module 308 is used for obtaining the document snippets related to the query term from each of the search engines. Each of the document snippets possesses at least one sentence. Moreover, the term analyzing module 310 is used for analyzing each of the document snippets to create a related term table, such as the related term table 204 shown in FIG. 2. For each of the document snippets in the related term table, several keyterms appeared in the corresponding document snippet are listed and each of the keyterms possesses a semantic meaning. The term analyzing module 310 further comprises a segmentation module 312 and a weighting module 314. The segmentation module 312 is used for analyzing each of the document snippets to list several potential terms for each of the document snippets (as shown in the potential term table 202 in FIG. 2). The weighting module 314 is used for determining the keyterms corresponding to each of the document snippets from the potential terms of each of the document snippets. The weighting module 314 can, for example, operate a term frequency-inverse document frequency calculation.

Furthermore, the correlation analyzing module 318 is used for giving each of the keyterms in each of the document snippets a correlation value according to a position relationship between the query term and each of the keyterms in each of the document snippets. The position relationship between the query term and each of the keyterms in the document snippet is determined by at least a distance parameter 320 and a sentence parameter 322. The distance parameter 320 is the number of the sentences interleaving between the keyterm and the query term. The larger the number of the sentences interleaving between the keyterm and the query term in the same document snippet is, the lower the correlation between the keyterm and the query term is. Furthermore, the sentence parameter 322 is the frequency of the keyterm and the query term appearing in the same single sentence. The larger the frequency of the keyterm and the query term appearing in the same single sentence is, the higher the correlation between the keyterm and the query term is. The correlation analyzing module 318 is operated with the use of the aforementioned two parameters according to the first equation mentioned in the previous embodiment so as to quantify the correlation between the keyterm and the query term to be a correlation value.

The semantic merging module 324 is used for merging the correlation values of the keyterms with the same semantic meaning throughout the document snippets to be the correlation indicators. In one embodiment, the semantic merging module 324 further comprises a semantic centroid calculation module 326 and a normalization module 328. The semantic centroid calculation module 324 is used for calculating the correlation values of keyterms having the same semantic meaning throughout the document snippets to be the centroid values respectively. The semantic centroid calculation module 326 is operated according to the second equation mentioned in the previous embodiment to calculate the correlation values of the keyterms having the same semantic meaning throughout the document snippets to be the centroid value. Moreover, the normalization module 328 is used for normalizing the centroid value corresponding to the keyterm to be a correlation indicator. The sum of the correlation indicators is equal to 1. The normalization module 328 is operated according to the third equation mentioned in the previous embodiment to normalize the centroid values into the correlation indicators respectively.

Additionally, the keyterm set determining module 330 is used for determining portions of the keyterms to be a keyterm set of the query term according to the correlation indicator of each of the keyterms. Thereafter, the determined keyterm set is provided to the user through the user interface 302.

In the two aforementioned embodiments of the present invention, the method of instantly expanding a keyterm can be implemented by executing a computer readable and writable program and the system for instantly expanding a keyterm can be, for example, the aforementioned computer readable and writable program/a program capable of instantly expanding a keyterm. Furthermore, the computer readable and writable program can be, for example, stored in a computer readable and writable recording medium for executing several instructions so as to practically implement the keyterm expansion method disclosed by the present invention. The steps of the keyterm expansion method are detailed described in the previous embodiment and are not further described herein.

Altogether, in the present invention, according to the query term, the document snippets instantly obtained by using the search engines are used as a semantic space instead of storing the whole documents. Therefore, it is unnecessary to build up a bulk database for storing the searched documents. Hence, demands for the memory space to operate the search process is decreased. Moreover, since it is unnecessary to build up a database for storing the documents related to the query term, the database maintenance is unnecessary. Further, because the search engines directly search data in the Internet instead of searching the data in the fixed database, the search result related to the query term is not limited by the specific data domain of the database. Accordingly, the problem of the search result belonging to specific field due to the data domain shifting can be overcome. Furthermore, since the search engines directly search data in the Internet and the document snippets are used as a semantic space for the query term, the quantity of the keyterm related to the query term is instantly expanded and the speed for displaying the keyterm set is increased.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for instantly expanding a keyterm, comprising:

receiving a query term;

according to the query term, performing a data search process by using a plurality of search engines;

obtaining a plurality of document snippets related to the query term from each of the search engines, wherein each of the document snippets contains at least a sentence;

analyzing each of the document snippets to create a related term table, wherein, for each of the document snippets in the related term table, a plurality of keyterms appeared in each of the document snippets are listed and each of the keyterms possesses a semantic meaning;

according to a position relationship between the query term and each of the keyterms in each of the document snippets, performing a correlation calculation for giving each of the keyterms in each of the document snippets a correlation value;

performing a semantic merging process to merge the correlation values of the keyterms with the same semantic meaning throughout the document snippets to be a correlation indicator, wherein the semantic merging process further comprises:
  performing a semantic centroid calculation for calculating the correlation values of keyterms having the same semantic meaning throughout the document snippets to be a plurality of centroid values respectively; and
  performing a normalization process for normalizing the centroid values to be a plurality of correlation indicators respectively, wherein a sum of the correlation indicators is equal to 1; and
according to the correlation indicator for each of the keyterms with the same semantic meaning, determining portions of the keyterms to be a keyterm set of the query term.

2. The method of claim 1, wherein the correlation calculation is performed according to a first equation as following:

$$\text{score}(\text{Query}, \text{Keyterm}_j) = \frac{2NS(\text{Query} \cap \text{Keyterm}_j)}{NS(\text{Query}) \cup NS(\text{Keyterm}_j)} \times \frac{1}{1 + \text{dist}(\text{Query}, \text{Keyterm}_j)},$$

wherein Query denotes the query term, Keyterm$_j$ denotes the keyterm, score (Query, Keyterm$_j$) denotes the correlation value of the keyterm related to the query term, NS(Query∩Keyterm$_j$) denotes a frequency of the keyterm and the query term appearing in the same single sentence, NS(Query) denotes an appearance frequency of the query term appearing in the document snippet, NS(Keyterm$_j$) denotes an appearance frequency of the keyterm appearing in the document snippet, NS(Query)∪NS(Keyterm$_j$) denotes a sum of the appearance frequency of the query term appearing in the document snippet and the appearance frequency of the keyterm appearing in the document snippet, dist(Query, Keyterm$_j$) denotes the number of the sentences interleaving between the query teem and the keyterm.

3. The method of claim 1, wherein the semantic centroid calculation is performed according to a second equation as following:

$$SC(\text{Keyterm}) = \frac{1}{n} \times \frac{\sum_{i=1}^{n} \text{snippet}_i}{\sqrt{\sum_{i=1}^{n} \text{snippet}_i^2}},$$

wherein Keyterm denotes the keyterm, SC (Keyterm) denotes the centroid value of the keyterm, snippet denotes the correlation values of the keyterms having the same semantic meaning throughout the document snippets, n denotes the number of the document snippets.

4. The method of claim 3, wherein the normalization process is performed according to a third equation as following:

$$NSC(\text{Keyterm}_k) = \frac{SC(\text{Keyterm}_k)}{\sqrt{\sum_{k=1}^{w} SC(\text{Keyterm}_k)^2}},$$

wherein Keyterm$_k$ denotes the keyterm, NSC (Keyterm$_k$) denotes the correlation indicator of the keyterm, SC (Keyterm$_k$) denotes the centroid value of the keyterm, w denotes the number of the keyterms.

5. The method of claim 1, wherein the method for creating the related term table comprises:
  analyzing each of the document snippets to list a plurality of the potential terms for each of the document snippets; and
  performing a weighting calculation for determining the keyterms corresponding to each of the document snippets from the potential terms of each of the document snippets.

6. The method of claim 5, wherein the weighting calculation comprises a term frequency-inverse document frequency calculation.

7. A computer readable and writeable recording medium for storing a program for instantly expanding a keyterm, wherein the program for instantly expanding a keyterm executes a plurality of instructions comprising:
  receiving a query term;
  according to the query term, performing a data search process by using a plurality of search engines;
  obtaining a plurality of document snippets related to the query term from each of the search engines, wherein each of the document snippets contains at least a sentence;
  analyzing each of the document snippets to create a related term table, wherein, for each of the document snippets in the related term table, a plurality of keyterms appeared in each of the document snippets are listed and each of the keyterms possesses a semantic meaning;
  according to a position relationship between the query term and each of the keyterms in each of the document snippets, performing a correlation calculation for giving each of the keyterms in each of the document snippets a correlation value;
  performing a semantic merging process to merge the correlation values of the keyterms with the same semantic meaning throughout the document snippets to be a correlation indicator, wherein the semantic merging process further comprises:
    performing a semantic centroid calculation for calculating the correlation values of keyterms having the same semantic meaning throughout the document snippets to be a plurality of centroid values respectively; and
    performing a normalization process for normalizing the centroid values to be a plurality of correlation indicators respectively, wherein a sum of the correlation indicators is equal to 1; and
  according to the correlation indicator for each of the keyterms, determining portions of the keyterms to be a keyterm set of the query term.

8. The computer readable and writeable recording medium of claim 7, wherein the correlation calculation is performed according to a first equation as following:

$$\text{score}(\text{Query}, \text{Keyterm}_j) = \frac{2NS(\text{Query} \cap \text{Keyterm}_j)}{NS(\text{Query}) \cup NS(\text{Keyterm}_j)} \times \frac{1}{1 + \text{dist}(\text{Query}, \text{Keyterm}_j)},$$

wherein Query denotes the query term, Keyterm$_j$ denotes the keyterm, score (Query, Keyterm$_j$) denotes the correlation value of the keyterm related to the query term, NS(Query∩Keyterm$_j$) denotes a frequency of the keyterm and the query term appearing in the same single sentence, NS(Query) denotes an appearance frequency of the query term appearing in the document snippet, NS(Keyterm$_j$) denotes an appearance frequency of the keyterm appearing in the document snippet, NS(Query)∪NS(Keyterm$_j$) denotes a sum of the appearance frequency of the query term appearing in the document snippet and the appearance frequency of the keyterm appearing in the document snippet, dist(Query, Keyterm$_j$) denotes the number of the sentences interleaving between the query term and the keyterm.

9. The computer readable and writeable recording medium of claim 7, wherein the semantic centroid calculation is performed according to a second equation as following:

$$SC(Keyterm) = \frac{1}{n} \times \frac{\sum_{i=1}^{n} snippet_i}{\sqrt{\sum_{i=1}^{n} snippet_i^2}},$$

wherein Keyterm denotes the keyterm, SC (Keyterm) denotes the centroid value of the keyterm, snippet denotes the correlation values of the keyterms having the same semantic meaning throughout the document snippets, n denotes the number of the document snippets.

10. The computer readable and writeable recording medium of claim 9, wherein the normalization process is performed according to a third equation as following:

$$NSC(Keyterm_k) = \frac{SC(Keyterm_k)}{\sqrt{\sum_{k=1}^{w} SC(Keyterm_k)^2}},$$

wherein Keyterm$_k$ denotes the keyterm, NSC (Keyterm$_k$) denotes the correlation indicator of the keyterm, SC (Keyterm$_k$) denotes the centroid value of the keyterm, w denotes the number of the keyterms.

11. The computer readable and writeable recording medium of claim 7, wherein the method for creating the related term table comprises:
  analyzing each of the document snippets to list a plurality of the potential terms for each of the document snippets; and
  performing a weighting calculation for determining the keyterms corresponding to each of the document snippets from the potential terms of each of the document snippets.

12. The computer readable and writeable recording medium of claim 11, wherein the weighting calculation comprises a term frequency-inverse document frequency calculation.

\* \* \* \* \*